(12) United States Patent
Mu

(10) Patent No.: US 10,481,482 B2
(45) Date of Patent: Nov. 19, 2019

(54) METHOD AND DEVICE FOR GENERATING PANORAMIC IMAGES

(71) Applicant: Shanghai Xiaoyi Technology Co., Ltd., Shanghai (CN)

(72) Inventor: Junzhou Mu, Beijing (CN)

(73) Assignee: SHANGHAI XIAOYI TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 15/873,018

(22) Filed: Jan. 17, 2018

(65) Prior Publication Data

US 2019/0011826 A1 Jan. 10, 2019

(30) Foreign Application Priority Data

Jul. 5, 2017 (CN) .......................... 2017 1 0541008

(51) Int. Cl.
| | |
|---|---|
| *H04N 5/232* | (2006.01) |
| *G03B 37/04* | (2006.01) |
| *G06T 3/40* | (2006.01) |
| *H04N 5/247* | (2006.01) |
| *H04N 7/18* | (2006.01) |
| *H04N 13/243* | (2018.01) |
| *H04N 13/296* | (2018.01) |
| *H04N 13/204* | (2018.01) |

(Continued)

(52) U.S. Cl.
CPC .............. *G03B 37/04* (2013.01); *G03B 35/02* (2013.01); *G03B 37/02* (2013.01); *G06T 3/4038* (2013.01); *H04N 5/23238* (2013.01); *H04N 5/247* (2013.01); *H04N 7/181* (2013.01); *H04N 13/106* (2018.05); *H04N 13/204* (2018.05); *H04N 13/243* (2018.05); *H04N 13/296* (2018.05); *H04N 13/282* (2018.05); *H04N 2013/0088* (2013.01)

(58) Field of Classification Search
CPC . H04N 5/23238; G06T 3/0068; G06T 3/0018; G06T 3/0093; G06T 3/4038; G06T 2207/20221
USPC .......................................................... 348/36
See application file for complete search history.

(56) References Cited

U.S. PATENT DOCUMENTS

| | | | | |
|---|---|---|---|---|
| 6,327,381 | B1 * | 12/2001 | Rogina | ................... G06T 15/10 |
| | | | | 382/154 |
| 8,933,985 | B1 * | 1/2015 | Rapaport | .............. G06T 3/4038 |
| | | | | 348/36 |

(Continued)

FOREIGN PATENT DOCUMENTS

| | | | |
|---|---|---|---|
| WO | WO 2010/025309 A1 | 3/2010 | |
| WO | WO 2015/182626 A1 | 12/2015 | |

OTHER PUBLICATIONS

Huang et al, Stereo panorama imaging and display for 3D VR system (Year: 2008).*

(Continued)

*Primary Examiner* — Shan E Elahi

(74) *Attorney, Agent, or Firm* — Cantor Colburn LLP

(57) ABSTRACT

A method and a device for generating panoramic images. The method includes capturing images from positions in a circular array, projecting the captured images into corresponding equirectangular images, extracting a set of intermediate images from the equirectangular images, and blending the set of intermediate images to generate panoramic images.

18 Claims, 13 Drawing Sheets

(51) Int. Cl.
*H04N 13/106* (2018.01)
*G03B 35/02* (2006.01)
*G03B 37/02* (2006.01)
*H04N 13/00* (2018.01)
*H04N 13/282* (2018.01)

(56) References Cited

U.S. PATENT DOCUMENTS

| | | | |
|---|---|---|---|
| 9,215,448 B2* | 12/2015 | Barnes | H04N 5/23293 |
| 9,369,679 B2* | 6/2016 | Arfvidsson | G06T 3/0062 |
| 9,877,016 B2* | 1/2018 | Esteban | G02B 27/0172 |
| 10,038,887 B2* | 7/2018 | Gallup | G02B 27/0172 |
| 10,084,962 B2* | 9/2018 | Kokaram | H04N 5/23238 |
| 10,244,226 B2* | 3/2019 | Weaver | H04N 5/23238 |
| 2002/0114987 A1* | 8/2002 | Oscarsson | B82B 3/00 436/524 |
| 2004/0001138 A1* | 1/2004 | Weerashinghe | G03B 35/08 348/36 |
| 2010/0097444 A1* | 4/2010 | Lablans | G03B 35/00 348/46 |
| 2012/0294549 A1 | 11/2012 | Doepke | |
| 2013/0044108 A1* | 2/2013 | Tanaka | G06T 15/04 345/419 |
| 2013/0100132 A1* | 4/2013 | Katayama | H04N 13/275 345/420 |
| 2014/0192144 A1* | 7/2014 | St. Clair | H04N 5/23238 348/36 |
| 2014/0210940 A1* | 7/2014 | Barnes | H04N 5/23293 348/36 |
| 2016/0071238 A1* | 3/2016 | Kimura | H04N 5/23238 348/36 |
| 2016/0080647 A1* | 3/2016 | Kimura | H04N 1/3876 348/36 |
| 2016/0080725 A1* | 3/2016 | Barnes | H04N 5/23293 348/36 |
| 2016/0198088 A1* | 7/2016 | Wang | H04N 5/23238 348/36 |
| 2016/0292821 A1* | 10/2016 | Cho | G06T 3/4038 |
| 2016/0295108 A1 | 10/2016 | Cao | |
| 2016/0352982 A1* | 12/2016 | Weaver | H04N 5/23238 |
| 2016/0353089 A1* | 12/2016 | Gallup | G02B 27/0172 |
| 2016/0353090 A1* | 12/2016 | Esteban | G02B 27/0172 |
| 2016/0379593 A1* | 12/2016 | Borenstein | H04N 13/257 348/62 |
| 2017/0363949 A1* | 12/2017 | Valente | H04N 13/344 |
| 2018/0160106 A1* | 6/2018 | Esteban | G02B 27/0172 |

OTHER PUBLICATIONS

Farid et al, A panoramic 3D video coding with directional depth aided inpainting (Year: 2014).*
Audu et al, Generation of three-dimensional content from stereo-panoramic view (Year: 2013).*
Partial European Search Report issued by the European Patent Office in counterpart European Patent Application No. 18181781.8 dated Nov. 26, 2018.

* cited by examiner

1000

1000

1202

1204

METHOD AND DEVICE FOR GENERATING PANORAMIC IMAGES

CROSS-REFERENCE TO RELATED APPLICATIONS

This application is based upon and claims priority to Chinese Patent Application No. 201710541008.2, filed Jul. 5, 2017, the entire contents of which are incorporated herein by reference.

TECHNICAL FIELD

The present disclosure relates to an image processing device and method, and more particularly, to a device and a method for generating panoramic images.

BACKGROUND

In many industrial, commercial, and scientific applications, a 360-degree panoramic imaging device is an important device for creating virtual reality content. Generally, the panoramic imaging device may include a plurality of cameras (e.g., 6, 12, or 16 cameras) in a circular array to capture images of scenes within 360°, so that the images of scenes may be combined into planar panoramic images by a method for generating the panoramic images. With a plurality of consecutive panoramic images being generated, a panoramic video may be further produced.

The panoramic imaging device may further generate stereoscopic panoramic images and videos, in additional to two-dimensional panoramic images and videos.

With the large number of images captured by the cameras, a huge flow of data has to be processed in order to generate panoramic images and videos. Even more processing capability is required to generate three-dimensional videos. Generally, however, the panoramic imaging device has only limited computing resources at its disposal, and may take a long time to process all images. Thus, user experience may be unsatisfactory due to the long processing time.

Embodiments of the disclosure address the above problem by providing an improved method and device for generating panoramic images.

SUMMARY

According to one aspect of the disclosure, a method for generating panoramic images is provided. The method may include capturing images from positions in a circular array, projecting the captured images into corresponding equirectangular images, extracting a set of intermediate images from the equirectangular images, and blending the set of intermediate images to generate panoramic images.

According to another aspect of the disclosure, a device for generating panoramic images is provided. The device may include a camera rig; at least one camera, mounted on the camera rig and configured to capture images from positions in a circular array; a memory, configured to store the captured images and instructions; and a processor, configured to execute the instructions to: project the captured images into corresponding equirectangular images, extract a set of intermediate images from the equirectangular images, and blend the set of intermediate images to generate panoramic images.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
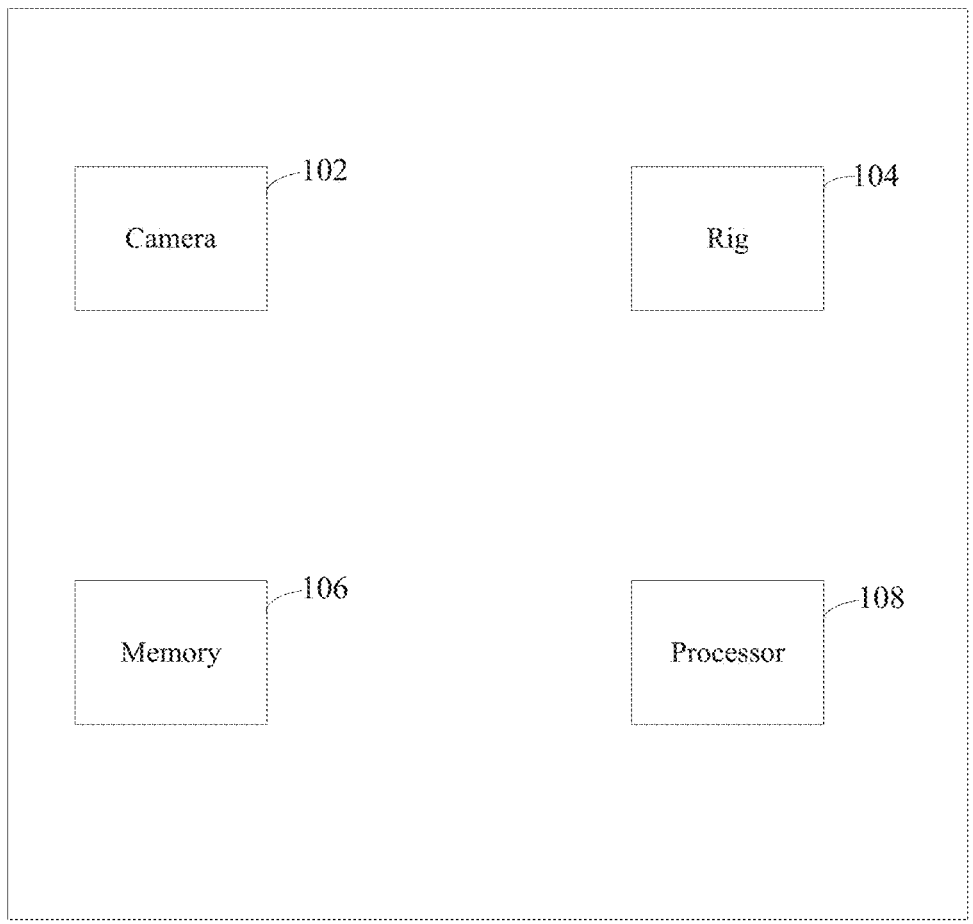
FIG. 1 is a block diagram of an exemplary imaging device for generating panoramic images, according to some embodiments of the disclosure.

FIG. 1 is a block diagram of an exemplary imaging device for generating panoramic images, according to some embodiments of the disclosure. As shown in FIG. 1, an imaging device 100 may include at least one camera 102, a memory 106, and a processor 108.

Figure 2:
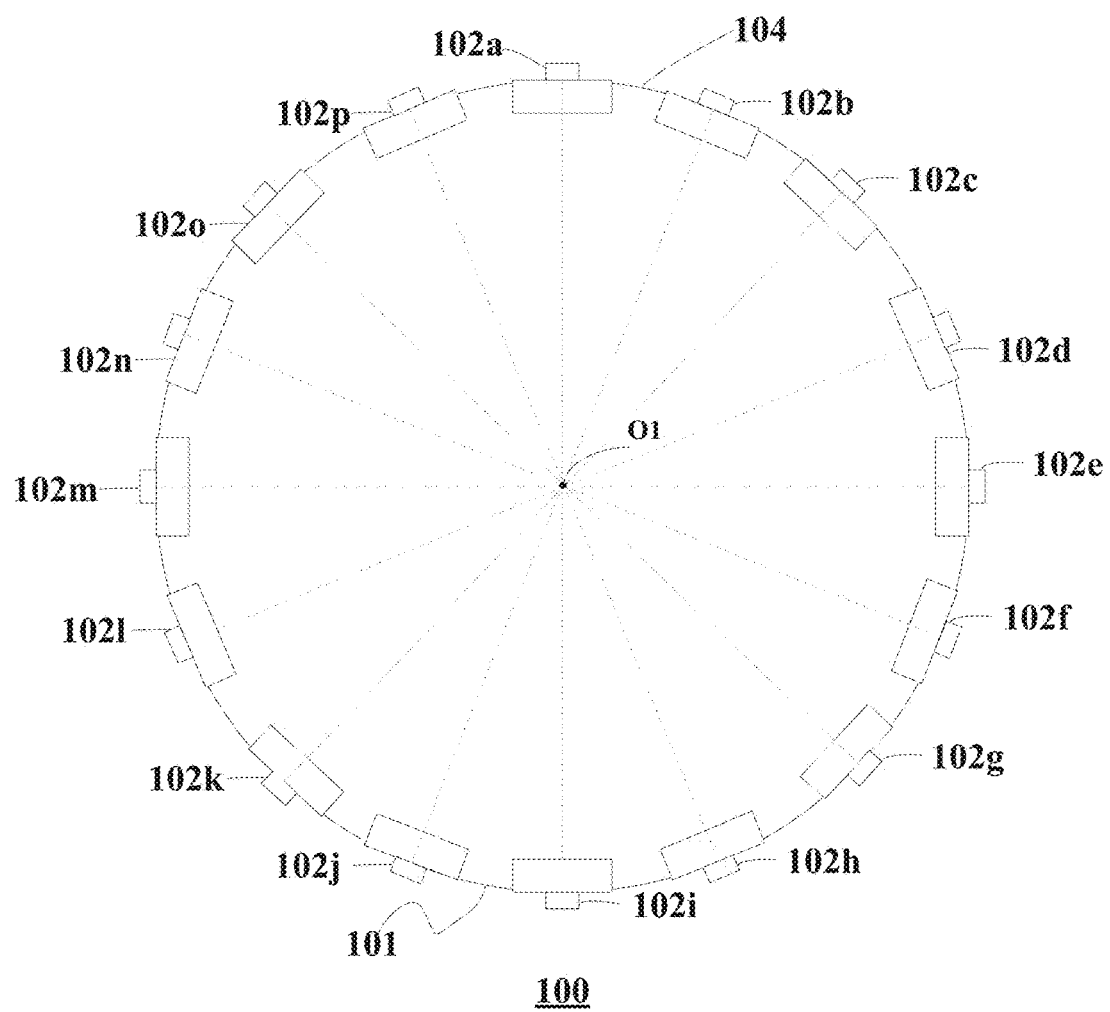
FIG. 2 is a top view of an exemplary camera rig having cameras disposed thereon, according to some embodiments of the disclosure.

FIG. 2 is a top view of an exemplary camera rig having cameras disposed thereon. In an embodiment shown in FIG. 2, imaging device 100 may include a camera array 101 having a plurality of cameras 102a-102p mounted on a circular camera rig 104. Cameras 102a-102p may each include an image sensor (not shown). The image sensor may be a Complementary Metal Oxide Semiconductor (CMOS) sensor, a Charge-Coupled Device (CCD) sensor, or any type of image sensor capable of capturing incident photons and reading pixel data to generate an image. The images generated by cameras 102a-102p may be transmitted to processor 108 for further processing.

Rig 104 may include a plurality of recesses or sockets in a circular array, so that at least one camera 102 may be disposed at the recesses or sockets corresponding to different positions in the circular array. Cameras 102a-102p face radially outward to capture a surrounding scene of imaging device 100. Cameras 102a-102p may be fixed or removably attached to rig 104.

Cameras 102a-102p each include a field of view (FOV), which may include a vertical FOV and a horizontal FOV. Generally, the cameras are arranged horizontally to simultaneously capture images of surrounding scenes, and the images are blended horizontally to generate panoramic images. Thus, FOVs mentioned in the disclosure generally refer to horizontal FOVs, unless indicated otherwise. In the embodiment shown in FIG. 2, sixteen cameras are arranged on rig 104 to capture images. In this case, FOV of each camera 102a-102p may be greater than 22.5° (i.e., 360°/16), so that sixteen cameras may cover the surrounding scene of 360°. Because the blending process discussed below generally requires some overlapping areas, the FOV of each camera may be much greater than a minimum FOV (e.g., 22.5°). It is appreciated that the number of cameras may be modified when it is necessary.

As shown in FIG. 2, sixteen cameras 102a-102p in a circular array are disposed on rig 104, facing radially outward to capture a surrounding scene. Therefore, the origin for viewing the captured surrounding scene is the center of the circular array, which is labeled as O1 in FIG. 2. In some embodiments, the radius of the circular array may be 200 millimeters. In some embodiments, each of the sixteen cameras 102a~102p may have a horizontal FOV of 90° (greater than the minimum of 22.5°) and a vertical FOV of 120°.

In another embodiment, rig 104 may further include a rotation unit (not shown), so that cameras on rig 104 may be rotated by the rotation unit. For example, imaging device 100 may include only one camera, and may capture a first image at a first position by the camera and then rotate the camera, via the rotation unit, by an angle (e.g., 22.5°) to a second position to capture a second image. By continuing to rotate the camera and capture images, all images that might have been captured by sixteen cameras simultaneously can also be captured by fewer cameras (e.g., only one camera).

It is appreciated that imaging device 100 may include other numbers of cameras. For example, imaging device 100 may include four cameras evenly disposed in a circular array. That is, with reference to FIG. 2, only cameras 102a, 102e, 102i, and 102m may be provided and rotated by the rotation unit. For example, camera 102a may be rotated to positions for cameras 102b, 102c, and 102d sequentially, and may capture images from each of the positions. Correspondingly, camera 102e may be rotated to positions for cameras 102f, 102g, and 102h sequentially and capture images, camera 102i may be rotated to positions for cameras 102j, 102k, and 102l sequentially and capture images, and camera 102m may be rotated to positions for cameras 102n, 102o, and 102p sequentially and capture images. Therefore, only four cameras may capture sixteen images as if there were sixteen cameras.

Therefore, the rotation unit allows fewer cameras to cover 360° of views, reducing the cost of imaging device 100. It should be noted that such configuration with a rotation unit may generate only stationary panoramic images, because it takes a finite period of time to rotate the imaging unit to capture images that are needed.

Memory 106 (FIG. 1) may be configured to store the instructions, data, and images captured for further processing. Memory 106 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Processor 108 may be configured to execute software instructions (program code), and performs functions in accordance with techniques described herein. For example, processor 108 may receive the captured images and perform the method according to some embodiments of the disclosure, so as to generate panoramic images. Software instructions include routines, programs, objects, components, data structures, procedures, modules, and functions, which perform particular functions further described herein.

Figure 3:
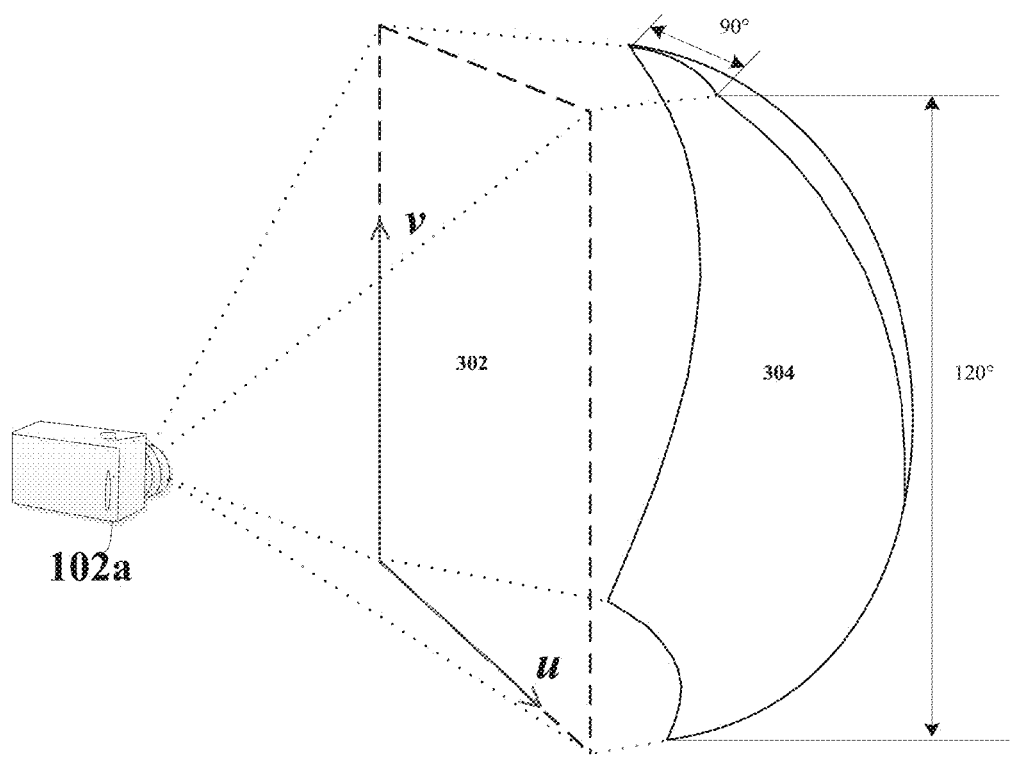
FIG. 3 is an exemplary schematic diagram of the field of view of a camera, according to some embodiments of the disclosure.

FIG. 3 is an exemplary schematic diagram of the field of view of one of cameras 102a-102p (for example, 102a), according to some embodiments of the disclosure. As shown in FIG. 3, camera 102a may generate a planar camera image 302 corresponding to a portion 304 of a viewing sphere. The viewing sphere is a virtual sphere, indicating the scope that the imaging device 100 may capture. It should be noted that, each of the sixteen cameras can generate a planar camera image corresponding to a portion of the viewing sphere. In other words, a camera captures a scene within a portion of the viewing sphere and projects the scene on a planar camera image. In FIG. 3, portion 304 of the viewing sphere corresponds a horizontal view of 90° and a vertical view of 120°, as camera 102a has a horizontal FOV of 90° and a vertical FOV of 120°.

FIG. 3 also illustrates a rectilinear image coordinate system for pixels in a planar camera image. The rectilinear image coordinate system of FIG. 3 is a two-dimensional coordinate system, including a horizontal axis u and a vertical axis v. It should be noted that, each planar camera image has its own image coordinate system, and each pixel in the planar camera image has its coordinates expressed in the corresponding rectilinear image coordinate system.

Because each camera image has its own image coordinate system, it is not convenient to directly generate panoramic images based on the planar images. Therefore, before any further processing, camera images should be projected into images in a common coordinate system.

As discussed above, each of the camera images captured by the sixteen cameras corresponds to a portion of a viewing sphere. That is, the camera images may be projected to spherical images in a spherical coordinate system of the viewing sphere. When the portion of the viewing sphere (e.g., a spherical image) is stretched onto a plane, an equirectangular image corresponding to the camera image may be generated. Because all spherical images can be measured in the same spherical coordinate system the generated equirectangular images may be also measured in a same coordinate system. Therefore, further processes may be performed on the equirectangular images in a more efficient manner. The process for generating the equirectangular image may be referred as an equirectangular projecting process.

It should be noted that as the equirectangular image is generated by "stretching" a portion of the viewing sphere onto a plane, the equirectangular image is also in a planar image coordinate system, but a system different from the planar image coordinate system for a camera image. Therefore, the equirectangular projecting process converts coordinates of a pixel in a first image coordinate system for a camera image into coordinates of a corresponding pixel in a second image coordinate system for an equirectangular image.

In the equirectangular projection process, each pixel of a camera image may be projected to an equirectangular image according to an equirectangular mapping table. The equirectangular mapping table includes positional relations between pixels of the camera image and pixels of the equirectangular image. In some embodiments, the equirectangular mapping table is determined and stored in imaging device 10) in advance, so that the equirectangular projection process may be performed efficiently.

Figure 4:
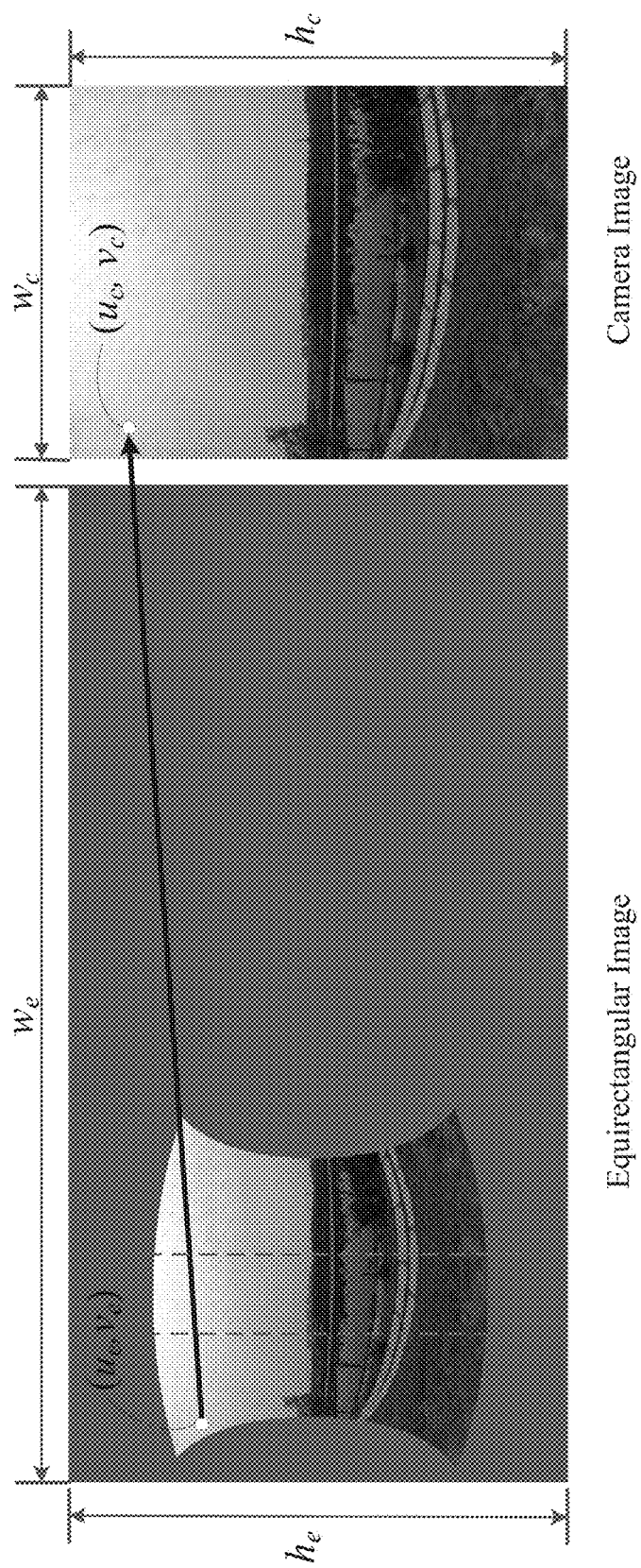
FIG. 4 is an exemplary positional relation between a pixel of an equirectangular image and a corresponding pixel in a camera image, according to some embodiments of the disclosure.

FIG. 4 illustrates an exemplary positional relation between a pixel of an equirectangular image and a corresponding pixel in a camera image, according to some embodiments of the disclosure. As shown in FIG. 4, a position for a pixel in the equirectangular image is indicated by ($u_e$, $v_e$), and a position for the same pixel in the camera image is indicated by ($u_c$, $v_c$). Furthermore, a width of the equirectangular image is $w_e$, a height of the equirectangular image is $h_e$, a width of the camera image is $w_c$, and a height of the camera image is $h_c$. As can be seen from FIG. 4, the top area and the bottom area of the camera image are "stretched" toward both sides in the equirectangular image.

Positional relations between each pixel in the equirectangular image and a corresponding pixel in the camera image constitute elements of the equirectangular mapping table. Similarly, positional relations between each pixel in the equirectangular image and a corresponding pixel in another camera image also constitute the elements of equirectangular mapping table.

A process for determining these positional relations between the equirectangular image and the camera image to construct the equirectangular mapping table will now be described. Coordinates for each pixel may be transformed among different coordinate systems, so as determine the positional relations between the equirectangular image and the camera image. In some embodiments, the coordinate systems may include a first image coordinate system for the equirectangular image, a second image coordinate system for the camera image, a spherical coordinate system, a world coordinate system, and a camera coordinate system, which will be further discussed.

The pixel at ($u_e$, $v_e$) of the equirectangular image will first be converted to determine a corresponding position in the spherical coordinate system. The spherical coordinate system may be further converted to the world coordinate system, then the camera coordinate system, and finally the second image coordinate system for the camera image. By means of these transitions among the coordinate systems, the positional relation between a pixel at ($u_e$, $v_e$) in the camera image and a pixel at ($u_e$, $v_e$) in the equirectangular image may be determined. Similarly, positional relations between pixels in another camera image and corresponding pixels in the equirectangular image may also be determined.

Figure 5:
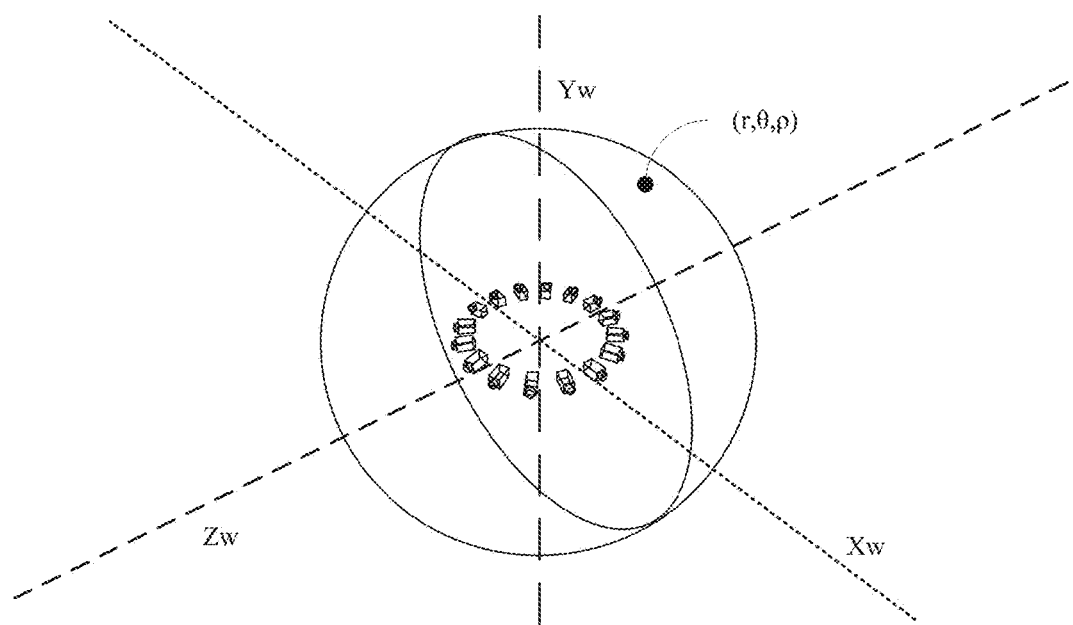
FIG. 5 is a schematic diagram of a spherical coordinate system for an imaging device, according to some embodiments of the disclosure.

Firstly, a first coordinate transition may be performed between an image coordinate system for the equirectangular image and a spherical coordinate system FIG. 5 is a schematic diagram of a spherical coordinate system for an imaging device, according to some embodiments of the disclosure. As discussed above, the pixel at ($u_e$, $v_e$) of the equirectangular image will first be converted to a spherical coordinate system. A position for a pixel in the spherical coordinate system may be represented by coordinates (r, θ, ρ), wherein r is a radial distance, θ is an azimuthal angle, and ρ is a polar angle.

Coordinates ($u_e$, $v_e$) in the equirectangular image may correspond to coordinates (r, θ, ρ) in a spherical coordinate system by equations below.

$$\theta = \frac{\pi}{2} - \frac{\pi u_e}{h_e} \qquad \text{Equation 1.1}$$

$$\rho = \frac{2\pi v_e}{w_e} \qquad \text{Equation 1.2}$$

In some embodiments, r may be set to 1500 millimeters.

Then, a second coordinate transition may be performed between the spherical coordinate system and a world coordinate system (WCS). The world coordinate system (WCS) is a universal coordinate system. Coordinates in any other coordinate system may be transformed into coordinates in the WCS, and vice versa FIG. 5 further illustrates an exemplary world coordinate system. As shown in FIG. 5, the origin of the world coordinate system and the origin of the spherical coordinate system are both located at center of the circular array formed by the cameras.

Therefore, the coordinates (r, θ, ρ) in the spherical coordinate system may be further transformed to corresponding coordinates ($x_w$, $y_w$, $z_w$) in the world coordinate system by equations below.

$$x_w = -\cos(\theta)\sin(\rho)r \qquad \text{Equation 2.1}$$

$$y_w = \sin(\theta)r \qquad \text{Equation 2.2}$$

$$z_w = \cos(\theta)\cos(\rho)r \qquad \text{Equation 2.3}$$

Figure 6:
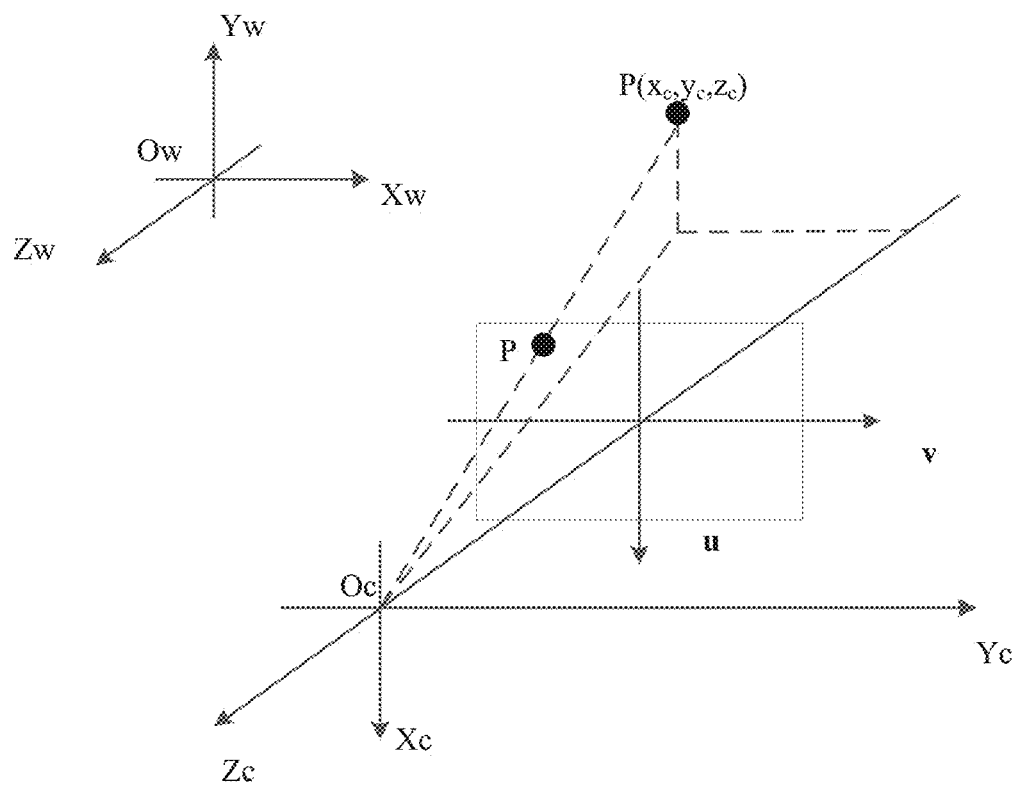
FIG. 6 is a schematic diagram of a camera coordinate system according to some embodiments of the disclosure.

A third coordinate transition may be performed to transform coordinates in the world coordinate system into coordinates in a camera coordinate system (CCS). FIG. 6 is a schematic diagram of a camera coordinate system, according to some embodiments of the disclosure. The camera coordinate system is another three-axis coordinate system that has an origin Oc located at the optical center of a camera. In the CCS, the Xc axis and the Yc axis are respectively parallel to u axis and v axis of the image plane, and Zc axis is the optical axis of the camera. As can be seen from FIG. 6, there is a displacement between the world coordinate system and the camera coordinate system.

Coordinates ($x_w$, $y_w$, $z_w$) in the world coordinate system will be further transformed to camera coordinates ($x_c$, $y_c$, $z_c$) in the camera coordinate system by an equation as below.

$$[x_c, y_c, z_c]^T = R[x_w, y_w, z_w]^T + T \qquad \text{Equation 3.1}$$

In the above Equation 3.1, R is a 3×3 rotation matrix between the camera coordinate system and the world coordinate system. And T is a 3×1 translation vector of the two coordinate systems. In other words, R and T describe the relative positional relation between the camera coordinate system and the world coordinate system. Both R and T are extrinsic parameters unique to each camera.

Generally, the camera coordinate system is displaced from the world coordinate system, and may be further shifted or rotated. For example, with reference back to FIG. 5, a displacement between the world coordinate system and the camera coordinate system for a camera may be a vector between the center of the circular array and the optical center of the camera, which are the origins for the world coordinate system and the camera coordinate system respectively. And R and T may reflect the above exemplary positional relation between the world coordinate system and the camera coordinate system of the camera, for instance.

Therefore, the positional relation between a pixel of the camera image and a corresponding pixel of the equirectangular image may be generated according to the above Equations 1.1, 1.2, 2.1-2.3, and 3.1. Generally, positional relations between all pixels of the equirectangular image and all corresponding pixels of the camera images may be generated in advance. The positional relations may be stored to form an equirectangular mapping table.

Positional relations may be generated for pixels in each of images captured at different positions, and stored into a same equirectangular mapping table or several mapping tables respectively.

Given coordinates of a pixel in the camera image, corresponding coordinates in the equirectangular image may be obtained from the equirectangular mapping table. Then, values of pixels in the camera image may be provided to pixels at the corresponding coordinates in the equirectangular image, so as to generate the equirectangular image.

Furthermore, coordinates of a pixel in one of the image coordinate system, the world coordinate system the camera coordinate system, and the spherical coordinate system may be transformed to coordinates in another one of the coordinate systems mentioned above.

As discussed above, in some embodiments, sixteen cameras are disposed in a circular array to capture images for a surrounding scene of 360°, and each of the sixteen cameras may have an FOV of 90°. Theoretically, those sixteen cameras may cover up to 1440° (i.e., 90°×16). Therefore, each camera has an FOV that is much greater than a minimum FOV that is needed to generate a panoramic image.

In some embodiments, an intermediate image may be extracted from each of the equirectangular images, to generate a set of intermediate images. For example, a center portion of each of the equirectangular images may be extracted as an intermediate image to generate a set of intermediate images. With reference back to FIG. 4, a center portion of the equirectangular image between the dashed lines may be extracted as an intermediate image.

As discussed above, coordinates of each pixel in an equirectangular image may be transformed to coordinates in a spherical coordinate system. That is, any image captured by a camera may be also discussed in a form of a corresponding spherical image in the spherical coordinate system. Therefore, the center portion of the equirectangular image may be measured by degrees as if it were in the spherical coordinate system.

The set of intermediate images may be further blended to generate panoramic images. For example, an overlapping area between two intermediate images may be determined and used for blending the two intermediate images.

Figure 7:
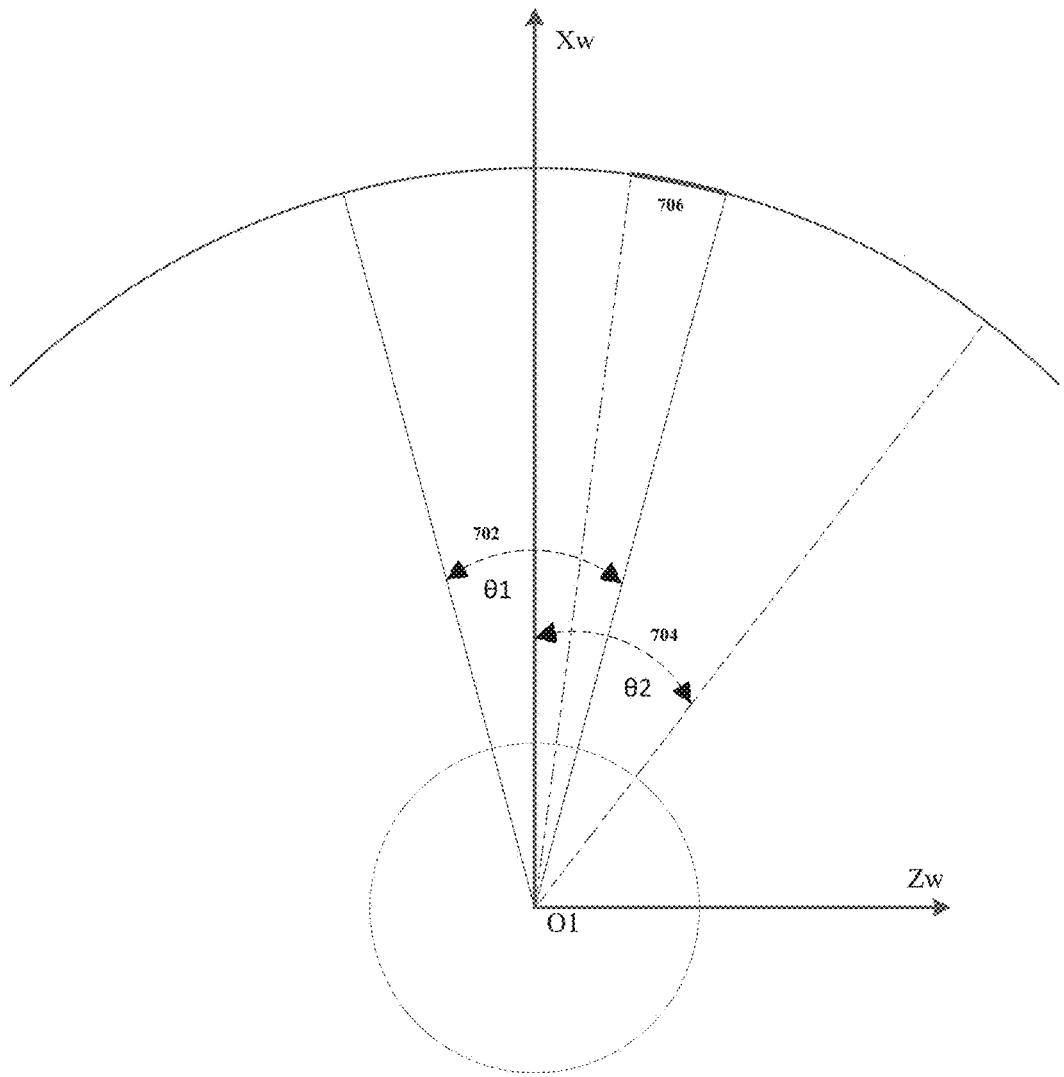
FIG. 7 is an exemplary schematic diagram of two partially overlapped intermediate images, according to some embodiments of the disclosure.

FIG. 7 is an exemplary schematic diagram of two partially overlapped intermediate images, according to some embodiments of the disclosure. As shown in FIG. 7, an intermediate image 702 and a neighboring intermediate image 704 may each correspond to a view of 30°, for example. Because the angle between the optical axes of two neighboring cameras is 22.5° (i.e., 360°/16), intermediate image 702 is displaced from intermediate image 704 by 22.50. That is, for example, when intermediate image 702 covers an azimuthal angle θ1 of 75°~105° (i.e., a view of 30°), intermediate image 704 covers an azimuthal angle θ2 of 52.5°~82.5°. Thus, an area 706 between 75°~82.5°, as shown by a weighted arc in FIG. 7, is an overlap between intermediate image 702 and intermediate image 704.

As discussed above, given the angles of view of two intermediate images and positions of cameras corresponding to the two intermediate images, an overlapping area between the intermediate images may be determined in the spherical coordinate system, and identified in any other coordinate system if needed. It should be appreciated that other methods for determining an overlapping area may be adopted. For example, identical feature points between the two intermediate images may be used to determine the overlapping area.

After the overlapping area has been determined, the two intermediate images may be blended based on the overlapping area, by means of any suitable blending method, for example, a pyramid blending method. A pyramid blending method may build Laplacian pyramids LA and LB from the two intermediate images, build a Gaussian pyramid GM from the two intermediate images further in combination of a mask M (e.g., a matrix of 5×5), and generate a blended image based on the Laplacian pyramids and the Gaussian pyramid.

In the pyramid blending method, the Gaussian pyramid may include several images consisting of an image pyramid. The original image may be considered as the lowest layer (Layer 0) of the image pyramid. A convolution may be performed on the original image based on the mask M to generate a convoluted image. Then, the convoluted image may be sampled, for example, by removing odd lines and odd columns, so that Layer 1 above the original image is generated. Layer 1 may be further used as an input for the above process, to obtain a higher layer. These layers may constitute the Gaussian pyramid.

During the calculation of the Gaussian pyramid, the convolution and sampling may discard a considerable amount of high frequency information. In order to describe the high frequency information that is lost during the calculation of the Gaussian pyramid, the Laplacian pyramid is generated. After the Laplacian pyramid has been generated, the blending process may be performed based on the Gaussian pyramid and the Laplacian pyramid. By means of the pyramid blending method, the overlapping area in the blended image may be more smooth, and color distortion may be fixed as well.

By blending all intermediate images extracted from the equirectangular images corresponding to the camera images, a panoramic image may be generated. It is appreciated that, in some embodiments, the intermediate image can be the equirectangular image itself.

Figure 8:
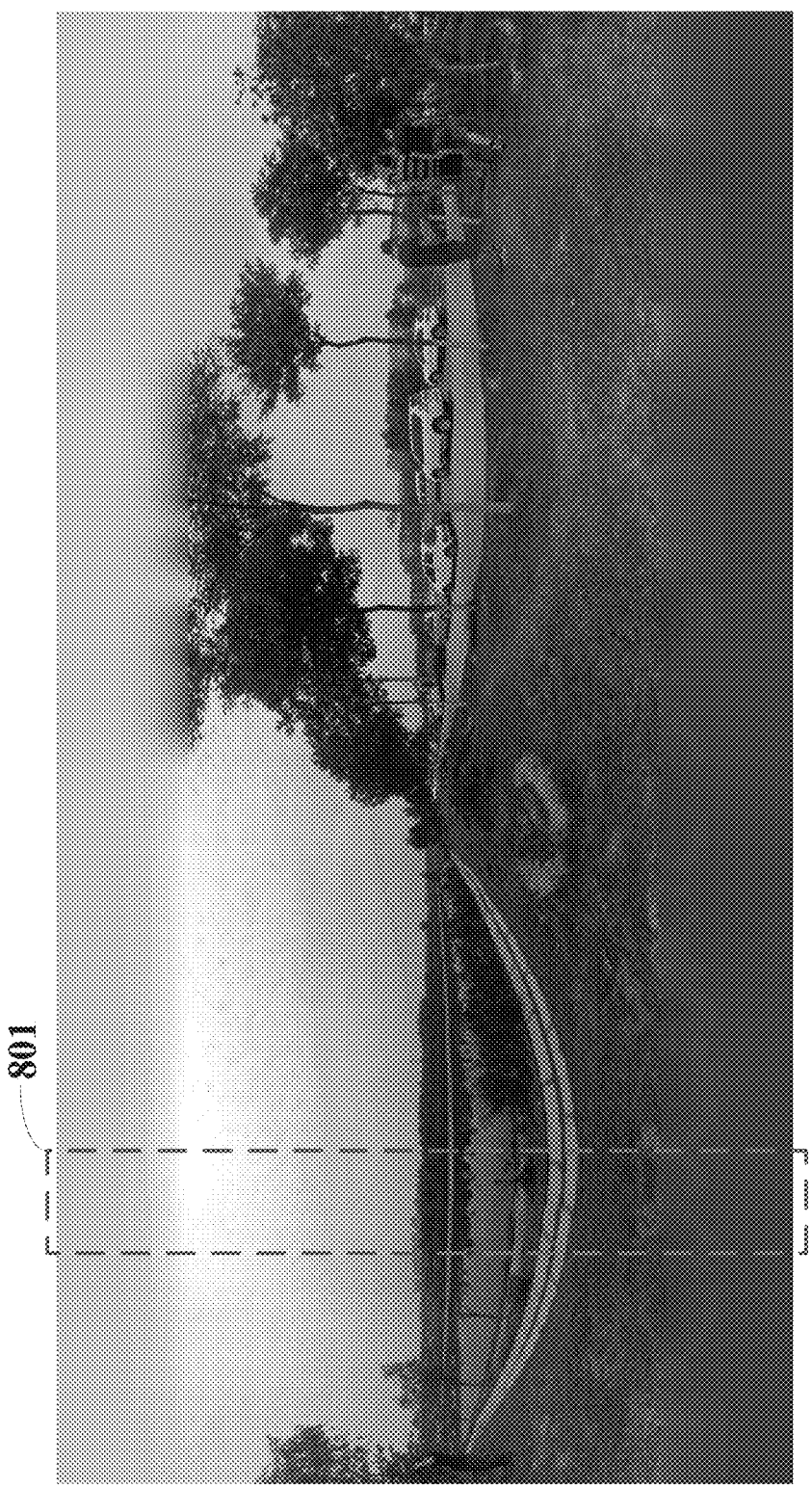
FIG. 8 is an exemplary panoramic image generated by an imaging device, according to some embodiments of the disclosure.

FIG. 8 is an exemplary panoramic image generated by imaging device 100, according to some embodiments of the disclosure. As shown in FIG. 8, an intermediate image 801 extracted from the exemplary equirectangular image in FIG. 4 has been blended, along with other intermediate images, into a panoramic image. The intermediate image 801 extracted from the exemplary equirectangular image is indicated by a dashed block.

Imaging device 100 may further generate stereoscopic panoramas, as described below.

Figure 9:
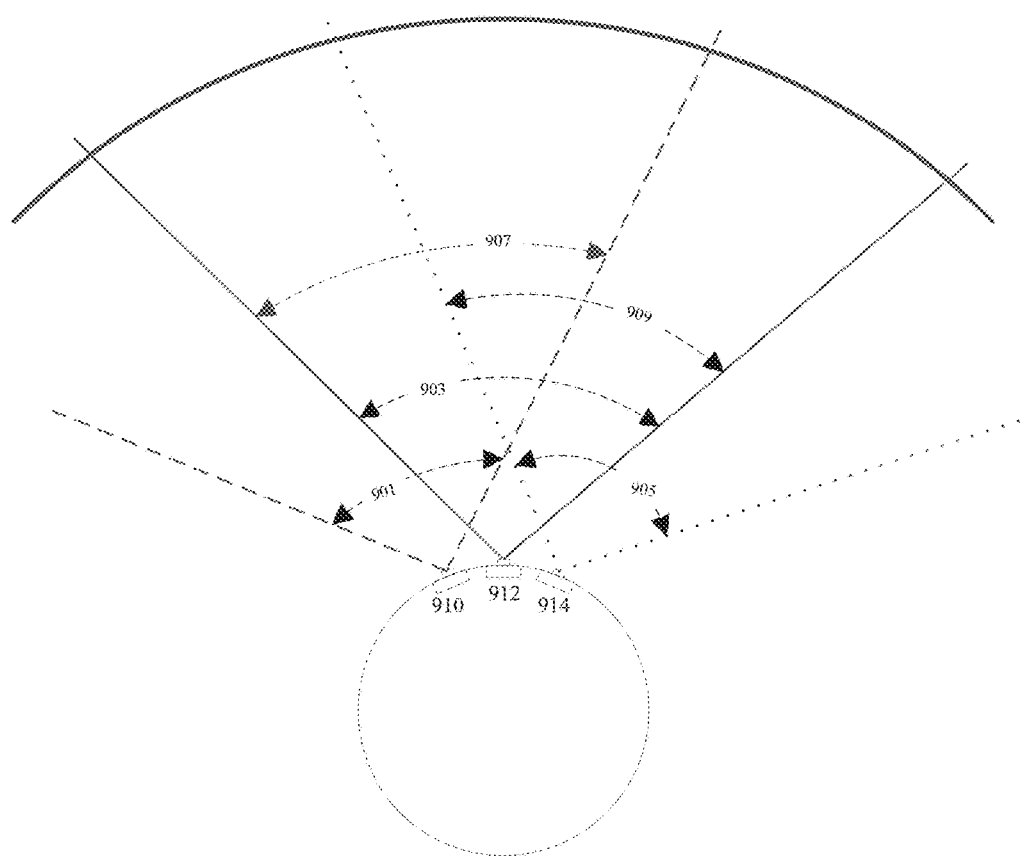
FIG. 9 is an exemplary schematic diagram of overlapped views among camera images, according to some embodiments of the disclosure.

FIG. 9 is an exemplary schematic diagram of overlapping views among camera images from which stereoscopic images may be generated, according to some embodiments of the disclosure. As discussed above, any image captured by a camera may be expressed in the form of a corresponding spherical image in the spherical coordinate system. Thus, as shown in FIG. 9, spherical images 901, 903, and 905 corresponding to views captured by cameras at positions 910, 912, and 914 are illustrated as examples of the spherical images. Positions 910, 912, and 914 are, for example, neighboring positions in a circular array, wherein position 910 is on a left side of position 912, and position 914 is on a right side of position 912. Other cameras and positions are omitted for clarity.

Because spherical images are captured by cameras with wide FOVs (e.g., 90°) and the angle between optical axes of the cameras are merely 22.5° (i.e., 360°/16), spherical image 903 partially overlaps with spherical image 901 to form an overlapping area 907, and spherical image 903 also partially overlaps with spherical image 905 to form an overlapping area 909. That is, a camera at position 910 and a camera at position 912 both capture a scene corresponding to overlapping area 907, and the camera at position 912 and a camera at position 914 both capture a scene corresponding to overlapping area 909.

When the camera at position 910 is considered as a left eye and the camera at position 912 is considered as a right eye, overlapping area 907 in spherical image 903 is a right-eye area. Similarly, when the camera at position 912 is considered as a left eye and the camera at position 914 is considered as a right eye, overlapping area 909 in spherical image 903 is a left-eye area. That is, spherical image 903 may include overlapping areas 907 and 909. It should be noted that, overlapping areas 907 and 909 also have an area further overlapped. Thus, a left-eye area and a right-eye area may be determined from each of the spherical images.

The above is discussed in the spherical coordinate system. Because coordinate systems may be converted to each other, a left-eye area and a right-eye area may be also similarly determined from each of the equirectangular images as they are determined from the spherical images. For example, a first equirectangular image corresponding to an first image captured at a first position, a second equirectangular image corresponding to a second image captured at a second position, and a third equirectangular image corresponding to a third image captured at a third position may be received, wherein the second position is on a left side of the first position, and the third position is on a right side of the first position. Then, a left-eye portion of the first equirectangular image that overlaps with the second equirectangular image may be extracted as a left-eye image, and a right-eye portion of the first equirectangular image that overlaps with the third equirectangular image may be extracted as a right-eye image.

It should be noted that, the left-eye portion may be a part of the overlapping area between the first equirectangular image and the second equirectangular image, rather than the whole overlapping area. So is the right-eye portion.

As seen from FIG. 9, given positions of the cameras, parameters of the spherical coordinate system, and field of views of the cameras, an overlapping area between two spherical images may be determined. In some embodiments, sixteen cameras are disposed in a circular array, the radius of which may be 200 millimeters. The radius r of the spherical coordinate system may be 1500 millimeters, and the FOV of each of the cameras may be 90°. Based on the above parameters, the overlapping area between two spherical images may be determined according to routine mathematic calculations. And an overlapping area between two equirectangular images may also be determined similarly, so that the left-eye and right-eye portions may be extracted from the two equirectangular images.

It should be noted that, other methods for determining an overlapping area may be adopted. For example, identical feature points between two images may be used to determine the overlapping area.

Figure 10A:
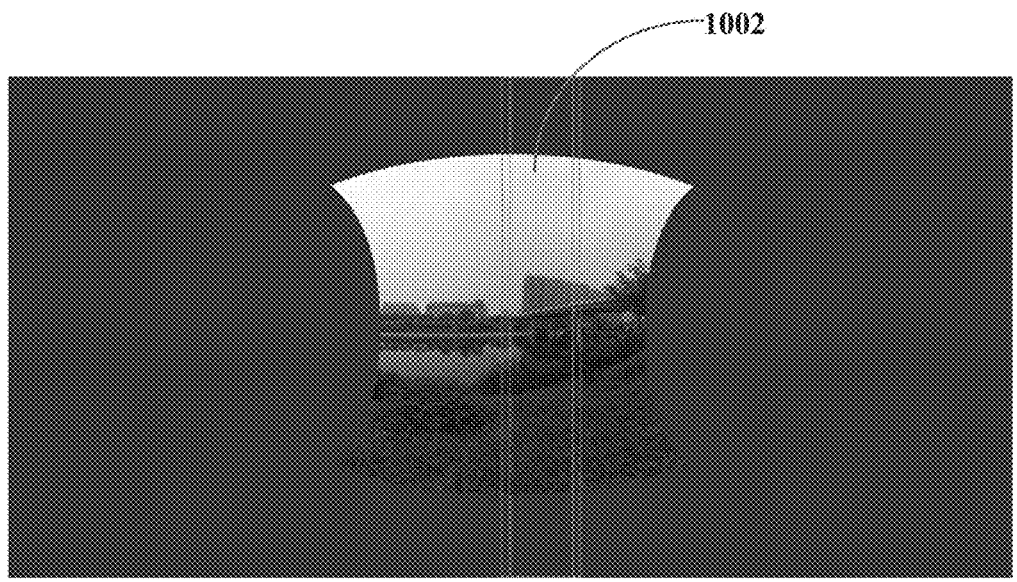
FIGS. 10A and 10B are schematic diagrams of a left-eye portion and a right-eye portion in an equirectangular image, according to some embodiments of the disclosure.
Figure 10B:
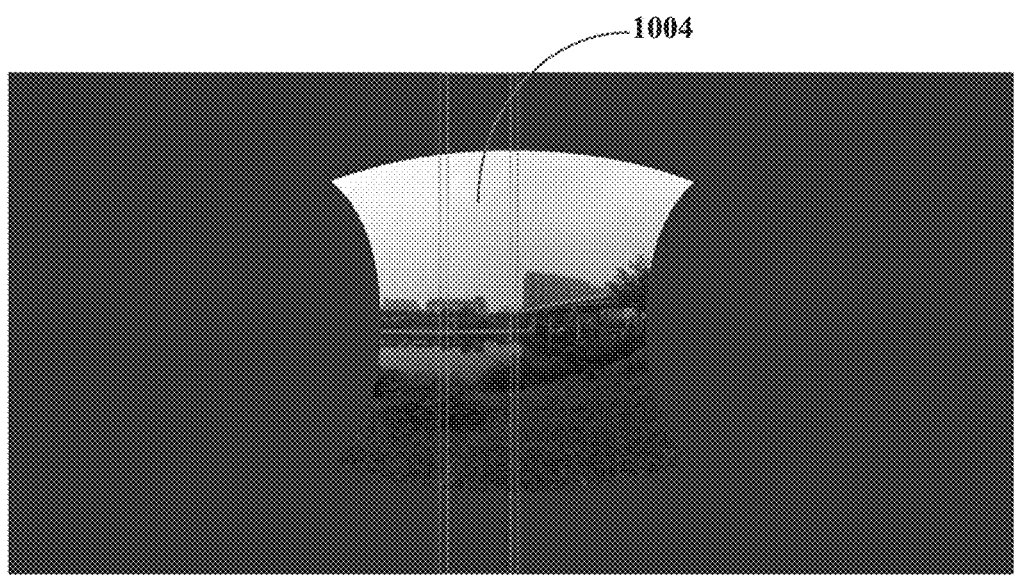

FIGS. 10A and 10B are schematic diagrams of a left-eye portion and a right-eye portion in an equirectangular image, according to some embodiments of the disclosure. Left-eye portions and right-eye portions may be extracted, as left-eye intermediate images and right-eye intermediate images, from the equirectangular images. The left-eye intermediate images and right-eye intermediate images may form a set of intermediate images, including a subset of the left-eye intermediate images and a subset of the right-eye intermediate images.

In some embodiments, a left-eye intermediate image 1002 is extracted from an equirectangular image 1000 as shown in FIG. 10A, and a right-eye intermediate image 1004 is extracted from the same equirectangular image 1000 as shown in FIG. 10B. Left-eye intermediate image 1002 and right-eye intermediate image 1004 may each cover an angle of view by, for example, 30°.

Figure 11:
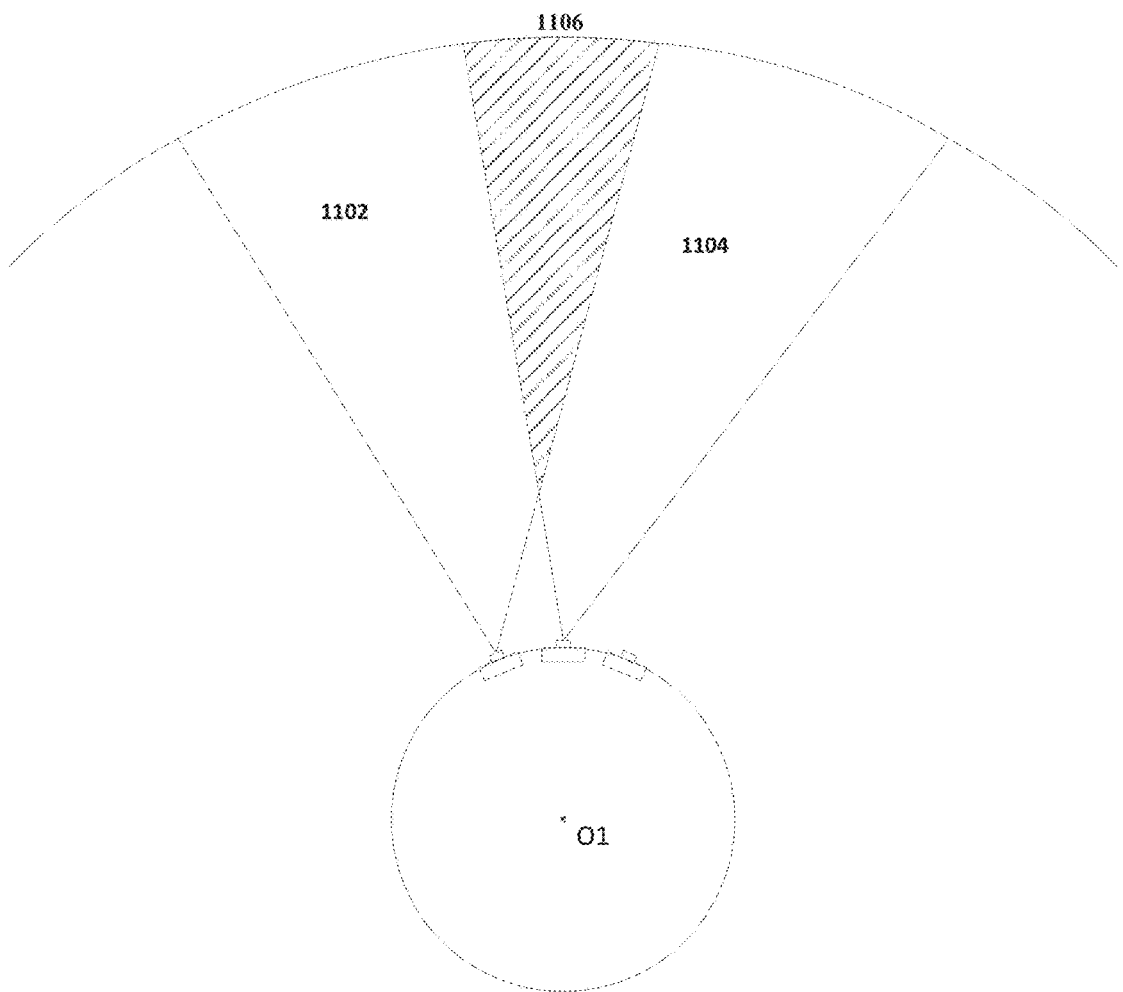
FIG. 11 is an exemplary schematic diagram of partially overlapped left-eye intermediate images, according to some embodiments of the disclosure.

An overlapping area between two intermediate image may be used for generating panoramic images, as discussed above. FIG. 11 is an exemplary schematic diagram of partially overlapped left-eye intermediate images, according to some embodiments of the disclosure. A first overlapping area 1106 (shadowed in FIG. 11) between two left-eye intermediate images 1102 and 1104 may be determined.

Similarly as discussed with reference to FIG. 7, given the angles of view of two left-eye intermediate images and positions of cameras corresponding to the left-eye intermediate images, the overlapping area between the left-eye intermediate images may be determined in the spherical coordinate system, and identified in any other coordinate system if needed.

The first overlapping areas between every two left-eye intermediate images may also be determined correspondingly. Similarly, the second overlapping areas between every two right-eye intermediate images may also be determined correspondingly, and the description and schematic diagram are omitted herein for clarity.

Any suitable blending method (for example, the pyramid blending method described above) may be performed on the left-eye intermediate images and right-eye intermediate images, so that the left-eye intermediate images may be blended based on the first overlapping areas to obtain a left-eye panoramic image and the left-eye intermediate images may be blended based on the first overlapping areas to obtain a left-eye panoramic image. By blending all left-eye and right-eye areas determined from the equirectangular images, a left-eye panoramic image and a right-eye panoramic image may be generated. When the left-eye and right-eye panoramic images are displayed to a left eye and a right eye of a user respectively, a stereoscopic panorama may be generated for the user.

Figure 12A:
FIGS. 12A and 12B respectively illustrate exemplar) left-eye and right-eye panoramic images generated according to some embodiments of the disclosure.
Figure 12B:

FIGS. 12A and 12B respectively illustrate exemplary left-eye and right-eye panoramic images generated according to some embodiments of the disclosure. A left-eye panoramic image 1202 in FIG. 12A and a right-eye panoramic image 1204 in FIG. 12B are aligned vertically, and a reference line (i.e., the dash line) is provided to illustrate parallax between left-eye panoramic image 1202 and right-eye panoramic image 1204. Parallax is a displacement or difference in the apparent position of an object viewed by two eyes, for example. The reference line is disposed next to a tree in right-eye panoramic image 1204. When the reference line extends through left-eye panoramic image 1202, the same tree is displaced from the reference line by a gap. The gap (or, displacement) in left-eye panoramic image 1202 indicates the so-called parallax. Therefore, a stereoscopic panorama may be generated for a user when the left-eye and right-eye panoramic images are displayed to a left eye and a right eye of the user respectively.

Above-disclosed imaging device 100 may capture images from positions in a circular array, project the captured images into corresponding equirectangular images, and generate panoramic images for 2D or 3D display based on the corresponding equirectangular images. Because the projected equirectangular images can be processed in a same coordinate system, the burden for processing may be reduced tremendously.

Figure 13:
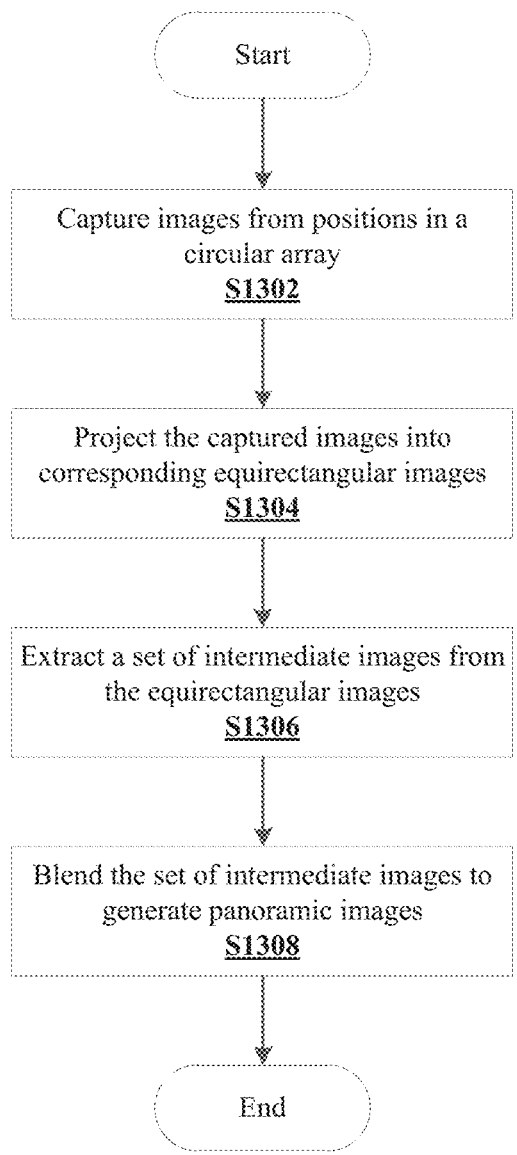
FIG. 13 is a flowchart of a method for generating a panoramic image, according to some embodiments of the disclosure.

Embodiments of the disclosure further include a method for generating panoramic images. FIG. 13 is a flowchart of a method 1300 for generating a panoramic image, according to some embodiments. For example, method 1300 may be performed by imaging device 100, and may include steps S302-S1308 discussed as below.

In step S1302, imaging device 100 may capture images from positions in a circular array. Imaging device 100 may include an imaging unit including at least one camera. In some embodiments, imaging device 100 may capture the images by cameras respectively disposed at the positions, facing radially outward. For example, the imaging unit may include sixteen cameras corresponding to sixteen different positions. The number of cameras may not be limited to sixteen, as long as the cameras covers a surrounding scene.

However, in some embodiments, the imaging unit may include fewer cameras to cover a surrounding scene. In this case, imaging device 100 may further include a rotation unit for rotating the imaging unit, so as to capture images for the surrounding scene. For example, imaging device 100 may capture images by capturing a first image by the imaging unit (e.g., including one camera) at a first position, and rotating the imaging unit by an angle to a second position to capture a second image. By continuing rotating the imaging unit, imaging device 100 may capture enough images for generating panoramic images.

In step S1304, imaging device 100 may project the captured images into corresponding equirectangular images. In some embodiments, imaging device 100 may project the captured images by receiving coordinates of pixels in the captured images, looking up the coordinates in a mapping table, obtaining corresponding coordinates of pixels in the equirectangular images from the mapping table, and supplying values of the pixels in the captured images to pixels in the corresponding coordinates of the equirectangular images. The mapping table may be generated and stored in imaging device 100 in advance. The method for generating the mapping table has been discussed above, and the description of which will be omitted herein for clarity. Because images captured by the cameras are in different camera coordinate systems, it is not convenient to process the captured imaged directly. By projecting captured images into the equirectangular images in a common coordinate system, the equirectangular images may be processed efficiently in subsequent steps.

In step S1306, imaging device 100 may extract a set of intermediate images from the equirectangular images. In one embodiment, imaging device 100 may receive the equirectangular images, and extract a center portion of each of the equirectangular images as the intermediate images, to obtain the set of intermediate images. In another embodiment, imaging device 100 may receive a first equirectangular image corresponding to a first image captured at a first position, a second equirectangular image corresponding to a second image captured at a second position, and a third equirectangular image corresponding to a third image captured at a third position. The second position is on a left side of the first position, and the third position is on a right side of the first position in the circular array. Imaging device 100 may further extract a first portion of the first equirectangular image that overlaps with the second equirectangular image as a first intermediate image, and extract a second portion of the first equirectangular image that overlaps with the third equirectangular image as a second intermediate image, and the set of intermediate images may include a subset of the first intermediate images and a subset of the second intermediate images. The first intermediate images may include scenes for presentation to a right eye of a user, and the second intermediate images may include scenes for presentation to a left eye of the user.

The set of intermediate images, either generated from the center portion of each of the equirectangular images or including the subset of the first intermediate images and the subset of the second intermediate images, may be further processed to generate panoramic images.

In step S1308, imaging device 100 may blend the set of intermediate images to generate panoramic images. In some embodiments, imaging device 100 may determine an overlapping area between two intermediate images in the set of intermediate images, and blend the two intermediate images based on the overlapping area to generate panoramic images. For example, when the set of intermediate images is generated from the center portion of each of the equirectangular images, two-dimensional panoramic images may be generated. When the set of intermediate images includes the subset of the first intermediate images and the subset of the second intermediate images, imaging device 100 may determine a first overlapping area between two first intermediate images in the subset of first intermediate images, and blend the two first intermediate images based on the first overlapping area to obtain a first panoramic image (e.g., image 1204 in FIG. 12); and determine a second overlapping area between two second intermediate images in the subset of second intermediate images, and blend the two second intermediate images based on the second overlapping area to obtain a second panoramic image (e.g., image 1202 in FIG. 12). The first panoramic image may be displayed to the right eye of the user and the second panoramic image may be displayed to the left eye of the user. Due to the parallax between the first and second panoramic images, the user can perceive the images as a three-dimensional panorama.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks may be substantially executed in parallel, and sometimes, they may also be executed in the reverse order, depending on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

It is further appreciated that embodiments of the present disclosure may be embodied as a method, a system, or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more computer-readable storage media (including but not limited to a magnetic disk memory, a CD-ROM, an optical memory, etc.) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, may be implemented by computer program instructions. These computer program instructions may be provided to a processor of a computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that may direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage may be implemented with any method or technology. Information may be modules of computer-readable instructions, data structures and programs, or other data Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising", "having", "containing", and "including", and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an", and "the" include plural references unless the context clearly dictates otherwise.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A method for generating panoramic images, comprising:
    capturing images by at least one camera from a plurality of positions in a circular array;
    projecting, by a processor, the captured images into corresponding equirectangular images;
    extracting, by the processor, a set of intermediate images from the equirectangular images; and
    blending, by the processor, the set of intermediate images to generate panoramic images,
    wherein the panoramic images comprise a first panoramic image including scenes for presentation to a right eye of a user and a second panoramic image including scenes for presentation to a left eye of the user.

2. The method of claim 1, wherein projecting the captured images further comprises:
- determining, by the processor, coordinates of pixels in a first coordinate system corresponding to the captured images;
- looking up the coordinates in a mapping table;
- obtaining corresponding coordinates of pixels in the equirectangular images from the mapping table; and
- supplying values of the pixels in the captured images to pixels in the corresponding coordinates of the equirectangular images.

3. The method of claim 1, wherein extracting a set of intermediate images comprises:
- extracting a center portion of each of the equirectangular images as an intermediate image, to obtain the set of intermediate images.

4. The method of claim 1, wherein extracting a set of intermediate images comprises:
- determining from the projected equirectangular images:
  - a first equirectangular image corresponding to a first image captured at a first position;
  - a second equirectangular image corresponding to a second image captured at a second position; and
  - a third equirectangular image corresponding to a third image captured at a third position;
  - wherein the second position is on a left side of the first position, and the third position is on a right side of the first position in the circular array;
- extracting, as a first intermediate image, a first portion of the first equirectangular image that overlaps with the second equirectangular image; and
- extracting, as a second intermediate image, a second portion of the first equirectangular image that overlaps with the third equirectangular image.

5. The method of claim 4, wherein:
- the set of intermediate images comprises a first subset of intermediate images and a second subset of intermediate images; and
- blending the set of intermediate images comprises:
  - determining a first overlapping area between two intermediate images in the first subset, and blending the two intermediate images in the first subset, based on the first overlapping area, to obtain the first panoramic image; and
  - determining a second overlapping area between two intermediate images in the second subset, and blending the two intermediate images in the second subset, based on the second overlapping area, to obtain the second panoramic image.

6. The method of claim 1, wherein blending the set of the intermediate images comprises:
- determining an overlapping area between two intermediate images in the set of the intermediate images; and
- blending the two intermediate images based on the overlapping area.

7. The method of claim 1, wherein capturing images from positions in a circular array comprises:
- capturing the images by sixteen cameras respectively disposed at the positions, facing radially outward.

8. The method of claim 1, wherein capturing images from positions in a circular array comprises:
- capturing a first image by one camera at a first position; and
- rotating the camera by an angle to a second position to capture a second image.

9. The method of claim 8, wherein the angle is 22.5 degrees.

10. A device for generating panoramic images, comprising:
- a camera rig;
- at least one camera, mounted on the camera rig and configured to capture images from a plurality of positions in a circular array;
- a memory, configured to store the captured images and instructions; and
- a processor, configured to execute the instructions to:
- project the captured images into corresponding equirectangular images;
- extract a set of intermediate images from the equirectangular images; and
- blend the set of intermediate images to generate panoramic images,
- wherein the panoramic images comprise a first panoramic image including scenes for presentation to a right eye of a user and a second panoramic image including scenes for presentation to a left eye of the user.

11. The device of claim 10, wherein the processor further executes the instructions to project the captured images into corresponding equirectangular images by:
- determining coordinates of pixels in the captured images in a first coordinate system;
- looking up the coordinates in a mapping table;
- obtaining corresponding coordinates of pixels in the equirectangular images in a second coordinate system from the mapping table; and
- supplying values of the pixels in the captured images to pixels in the corresponding coordinates of the equirectangular images.

12. The device of claim 10, wherein the processor further executes the instructions to extract a set of intermediate images by:
- extracting a center portion of each of the equirectangular images as intermediate images, to obtain the set of intermediate images.

13. The device of claim 10, wherein the processor further executes the instructions to extract a set of intermediate images by:
- determining from the projected equirectangular images:
  - a first equirectangular image corresponding to a first image captured at a first position;
  - a second equirectangular image corresponding to a second image captured at a second position; and
  - a third equirectangular image corresponding to a third image captured at a third position;
  - wherein the second position is on a left side of the first position, and the third position is on a right side of the first position in the circular array;
- extracting, as a first intermediate image, a first portion of the first equirectangular image that overlaps with the second equirectangular image; and
- extracting, as a second intermediate image, a second portion of the first equirectangular image that overlaps with the third equirectangular image.

14. The device of claim 13, wherein:
- the set of intermediate images comprises a first subset of intermediate images and a second subset of intermediate images; and
- the processor further executes the instructions to blend the set of intermediate images by:
  - determining a first overlapping area between two intermediate images in the first subset of intermediate images, and blending the two intermediate images based on the first overlapping area to obtain the first panoramic image; and determining a second overlapping area between two intermediate images in the second subset of intermediate images, and blending the two intermediate images based on the second overlapping area to obtain the second panoramic image.

15. The device of claim 10, wherein the processor further executes the instructions to blend the set of intermediate images by:

determining an overlapping area between two intermediate images in the set of intermediate images; and blending the two intermediate images based on the overlapping area.

16. The device of claim 10, wherein the device includes sixteen cameras respectively disposed at the positions, facing radially outward.

17. The device of claim 10, further comprising a rotation unit, wherein the device includes one camera, and captures a first image by the camera at a first position, and rotates, via the rotation unit, the camera by an angle to a second position to capture a second image.

18. The device of claim 17, wherein the angle is 22.5 degrees.

* * * * *